(12) United States Patent
Cabrita Condessa et al.

(10) Patent No.: US 12,535,803 B2
(45) Date of Patent: Jan. 27, 2026

(54) METHODS AND SYSTEMS FOR PERFORMING ROOT CAUSE ANALYSIS WITH A TRAINED MACHINE LEARNING MODEL

(71) Applicant: Robert Bosch GmbH, Stuttgart (DE)

(72) Inventors: Filipe J. Cabrita Condessa, Pittsburgh, PA (US); Devin T. Willmott, Pittsburgh, PA (US); Ivan Batalov, Pittsburgh, PA (US); João D. Semedo, Pittsburgh, PA (US); Bahare Azari, San Jose, CA (US); Wan-Yi Lin, Wexford, PA (US); Parsanth Lade, Fremont, CA (US)

(73) Assignee: Robert Bosch GmbH (DE)

( * ) Notice: Subject to any disclaimer, the term of this patent is extended or adjusted under 35 U.S.C. 154(b) by 650 days.

(21) Appl. No.: 17/956,275

(22) Filed: Sep. 29, 2022

(65) Prior Publication Data
US 2024/0126247 A1  Apr. 18, 2024

(51) Int. Cl.
*G05B 19/418* (2006.01)
*G05B 23/02* (2006.01)

(52) U.S. Cl.
CPC ... *G05B 19/41875* (2013.01); *G05B 19/4183* (2013.01); *G05B 23/0275* (2013.01)

(58) Field of Classification Search
USPC .......................................... 700/108
See application file for complete search history.

(56) References Cited

U.S. PATENT DOCUMENTS

| 10,728,282 | B2 | 7/2020 | Mestha et al. |
| 2020/0006100 | A1* | 1/2020 | Clark ............... H01L 21/68707 |
| 2020/0111204 | A1* | 4/2020 | Cosatto ............... G06T 7/0004 |
| 2022/0300518 | A1 | 9/2022 | Bigaj et al. |
| 2022/0344049 | A1 | 10/2022 | Hall et al. |
| 2022/0359041 | A1 | 11/2022 | Lee et al. |
| 2022/0414856 | A1* | 12/2022 | Sun ....................... G06T 7/0004 |

OTHER PUBLICATIONS

Gardner, "Exponential smoothing: The state of the art—Part II", International Journal of Forecasting 22 (2006), Texas, 30 pages.
(Continued)

*Primary Examiner* — Hien D Khuu
(74) *Attorney, Agent, or Firm* — Dickinson Wright PLLC (57) ABSTRACT

Methods and systems of using a trained machine-learning model to perform root cause analysis on a manufacturing process. A pre-trained machine learning model is provided that is trained to predict measurements of non-faulty parts. The pre-trained model is trained on training measurement data regarding physical characteristics of manufactured parts as measured by a plurality of sensors at a plurality of manufacturing stations. With the trained model, then measurement data from the sensors is received regarding the manufactured part and the stations. This new set of measurement data is back propagated through the pre-trained model to determine a magnitude of absolute gradients of the new measurement data. The root cause is then identified based on this magnitude of absolute gradients. In other embodiments the root cause is identified based on losses determined between a set of predicted measurement data of a part using the model, and actual measurement data.

20 Claims, 4 Drawing Sheets

(56) References Cited

OTHER PUBLICATIONS

Brown et al., "Language Models are Few-Shot Learners", arXiv:2005.14165v4 [cs.CL] Jul. 22, 2020, 75 pages.

JoséManuel Navarro Gonzalez et al., "Root Cause Analysis of Network Failures Using Machine Learning and ummarization Techniques," IEEE Communications Magazine, Sep. 2017, pp. 126-131.

Negin Javanbakht et al., "Alarm-Based Root Cause Analysis in Industrial Processes Using Deep Learning," arXiv:2203.11321v1 [eess.SY] Mar. 21, 2022, 19 Pages.

Lisa Abele et al., "Combining Knowledge Modeling and Machine Learning for Alarm Root Cause Analysis," 7th IFAC Conference on Manufacturing Modelling, Management, and Control International Federation of Automatic Control, Jun. 19-21, 2013, Saint Petersburg, Russia, pp. 1843-1848.

\* cited by examiner

METHODS AND SYSTEMS FOR PERFORMING ROOT CAUSE ANALYSIS WITH A TRAINED MACHINE LEARNING MODEL

TECHNICAL FIELD

The present disclosure relates to methods and systems for performing root cause analysis with a trained machine learning model.

BACKGROUND

Supervised machine learning has shown success in many domains, such as image classification, automatic speech recognition, visual question answering, and text-to-text translations. However, training a supervised model for every new task requires a large set of labeled examples, which limits the applicability of such models. Nevertheless, some tasks or data types could be difficult or very expensive for human annotation, for example, time series anomalies and text summarization. Conversely, if there is a large amount of unlabeled data from one domain, it is possible to learn correlations and representation of the data without requiring the use of highly expressive models.

Root cause analysis is the process of discovering the root causes of problems in order to identify appropriate solutions. Root cause analysis can be performed with a collection of principles, techniques, and methodologies that can all be leveraged to identify the root causes of an event or trend. Consider a manufacturing setting, for example, in which a manufactured part may require several (e.g., dozens) of steps from beginning to end until the part is finally manufactured. Measurements of the part before it is in its final state—and at each step along the manufacturing process—can aid in determining the root cause of a defect or other problem with the part.

SUMMARY

In one embodiment, a computer-implemented method of utilizing a pre-trained machine learning model to perform root cause analysis on a manufacturing process is provided. The method includes providing a pre-trained machine learning model that is trained to predict measurements of non-faulty parts, wherein the pre-trained machine learning model is trained based on a first set of measurement data regarding physical characteristics of a first plurality of manufactured parts as measured by a plurality of sensors at a plurality of manufacturing stations. The method also includes receiving, from the plurality of sensors at the plurality of manufacturing stations, a second set of measurement data regarding physical characteristics of a second plurality of manufactured parts and an identification of the plurality of manufacturing stations. The method also includes back propagating the second set of measurement data through the pre-trained machine learning model to determine a magnitude of absolute gradients of the second set of measurement data. The method also includes identifying a root cause within the manufacturing process based on the magnitude of absolute gradients.

In another embodiment, computer-implemented method of utilizing a pre-trained machine learning model to perform root cause analysis on a manufacturing process is provided. The method includes providing a pre-trained machine learning model that is trained to predict measurements of non-faulty parts, wherein the pre-trained machine learning model is trained based on a first set of measurement data regarding physical characteristics of a first plurality of manufactured parts as measured by a plurality of sensors at a plurality of manufacturing stations. The method also includes utilizing the pre-trained machine learning model to produce a set of predicted measurement data for each manufacturing station. The method also includes receiving, from the plurality of sensors at the plurality of manufacturing stations, a second set of measurement data regarding physical characteristics of a second plurality of manufactured parts and an identification of the plurality of manufacturing stations. The method also includes determining losses between the set of predicted measurement data and the second set of measurement data for each of the plurality of manufacturing stations, and identifying a root cause within the manufacturing process based on the losses.

In yet another embodiment, a computer-implemented method of utilizing a pre-trained machine learning model to perform root cause analysis to determine a part type causing a fault within a manufacturing setting is provided. The method includes providing a pre-trained machine learning model that is trained to predict measurements of non-faulty parts, wherein the pre-trained machine learning model is trained based on a first set of measurement data regarding physical characteristics of a first plurality of manufactured parts as measured by a plurality of sensors at a plurality of manufacturing stations. The method includes training a binary classification model using outputs of the pre-trained machine learning model to output predictions of whether at least one part type of a plurality of part type will be faulty. The method further includes determining a magnitude of absolute gradients of the binary classification model, and identifying at least one of the plurality of part types as a root cause within the manufacturing setting based on the magnitude of absolute gradients.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Root cause analysis is the process of discovering the root causes of problems in order to identify appropriate solutions. In the context of manufacturing processes, root cause analysis aims to identify underlying root causes associated with manufacturing failures (e.g., at different levels of severity), allowing them to be prevented or mitigated before they cause significant cumulative damage and losses. However, as modern manufacturing processes are increasingly complex, this task is not trivial. For example, before a manufactured part is in its final state, it may go through several (e.g., dozens) of manufacturing steps such as cutting, etching, bending, assembling, adhering, just to name a few. If a defect or problem arises in the manufactured part, without a clear understanding of the root cause of the problem, a part of the manufacturing process (or even the entire process) may have to be shut down until the cause of the problem is learned. This can be an extremely expensive endeavor.

Root cause analysis has been attempted in various forms in the past. In one example (Combining Knowledge Modeling and Machine Learning for Alarm Root Cause Analysis), Bayesian Networks are used to perform root cause analysis, with various networks, such as relying on expert knowledge-driven creating of causal networks, and using machine learning for structure search, which scales exponentially with the size of the system. These approaches are limited in terms of complexity of the causal relationship it is capable of modeling. Furthermore, the expert knowledge-based approach is labor-intensive and not generalizable to other systems.

In another example (Root Cause Analysis of Network Failures Using Machine Learning and Summarization Techniques), Random Forest-based models are used that does not rely on expert knowledge. While this approach is capable of learning complex relationships within the data, it is limited to categorical event-based data—where each data point is characterized by an event code and location code—and is not amendable to high-dimensional, multi-modal, continuous data types.

In another example (Alarm-Based Root Cause Analysis in Industrial Processes Using Deep Learning), a natural language-inspired approach is used to model complex alarm data in manufacturing processes. Each alarm code is embedded as a numerical vector, similar to word embeddings in NLP models. Then, a Bi-LSTM-CNN model with self-attention is trained on sub-sequences of embedded alarms to predict the type of fault scenario for each sequence. While this system uses sophisticated models capable of learning complex representations while leveraging the advances in deep learning for natural language processing, it is still limited in terms of the data types the model can utilize. Particular, the model works with sequences of alarm codes (categorical in nature) and cannot be easily adapted to work with other types of data.

Therefore, according to various embodiments disclosed herein, methods and systems for performing root cause analysis with a trained machine learning model are provided. The model can be trained by receiving measurement data regarding physical characteristics of manufactured parts as measured by a plurality of sensors at various manufacturing stations. A time-series dynamics machine learning model can encode the measurement data into a latent space having a plurality of nodes, with each node associated with the measurement data of one of the manufactured parts and at one of the manufacturing stations. A batch of the measurement data can be built, the batch including a first node and a first plurality of nodes immediately connected to the first node via first edges, and measured in time earlier than the first node. A prediction machine learning model can predict measurements of a first of the manufactured parts based on the latent space of the batch of nodes. To train the model, the predicted measurements can be compared to the actual measurements. This is disclosed in U.S. patent application Ser. No. 17/842,041, titled METHODS AND SYSTEMS FOR TRAINING A MACHINE LEARNING MODEL WITH MEASUREMENT DATA CAPTURED DURING MANUFACTURING PROCESS, which is incorporated by its entirety herein. Then, as disclosed herein, such a trained model can be utilized to perform a root cause analysis of either the measurement data regarding the physical characteristic of the part, the measurement data regarding an identification of a station in which the root cause has likely occurred, and/or an identification of a type of part in which the root cause is estimated to have occurred. For example, once the model is trained, one or more processors can receive, from a plurality of sensors at the plurality of manufacturing stations, a second set of measurement data regarding physical characteristics of a second plurality of manufactured parts and an identification of the plurality of manufacturing stations. Then, the processor(s) can backpropogate the second set of measurement data through the pre-trained machine learning model to determine a magnitude of absolute gradients of the second set of measurement data, and identify the root cause based on this magnitude of absolute gradients. Other methods of using the pre-trained model are described further below.

Figure 1:
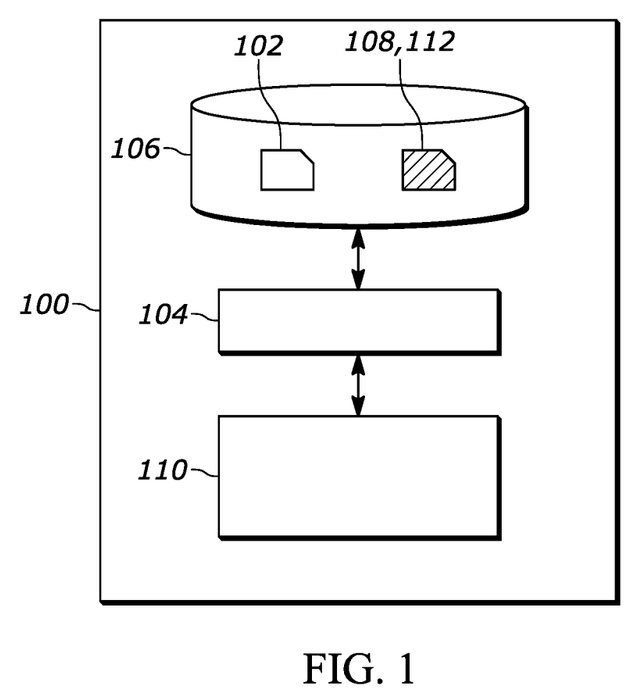
FIG. 1 shows a system for training a neural network, according to an embodiment.

The disclosed systems and methods rely on machine learning models, such as neural networks (e.g., deep neural networks (DNN), graphical neural networks (GNN), deep convolutional networks (DCN), convolutional neural networks (CNN), etc.) and the like. FIG. 1 shows a system 100 for training a neural network, e.g., a graphical neural network. The neural networks illustrated and described herein merely examples of the types of machine learning networks or neural networks that can be used. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input the output of a previous layer, or for a first layer of the stack of layers, an initial activation, and a part of the input of the stack of layers. The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network.

The system 100 may further comprise an output interface for outputting a data representation 112 of the trained neural network. This data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may, during or after the training, be replaced at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

Figure 4:
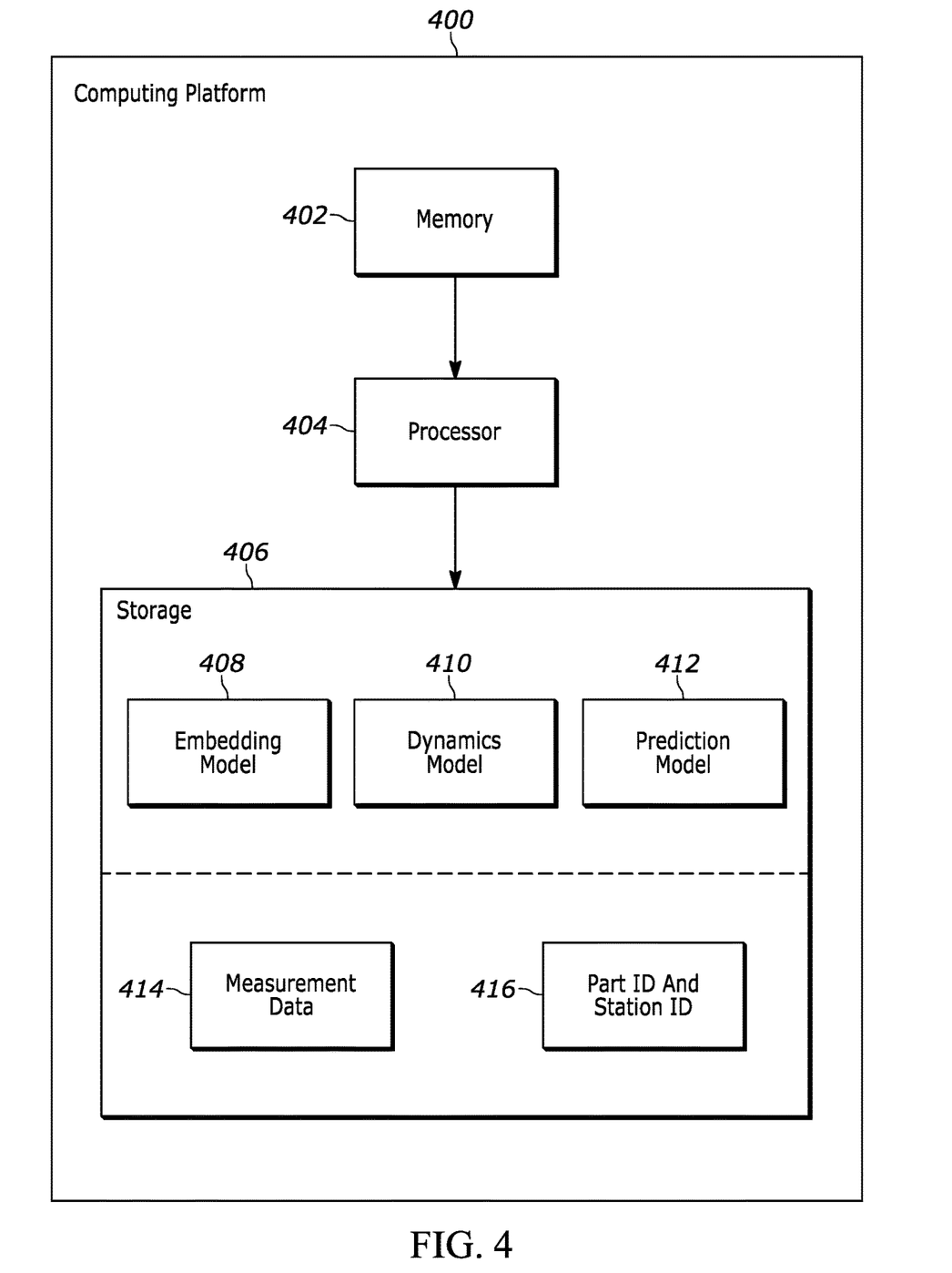
FIG. 4 shows a schematic diagram of a computing platform that may be utilized to implement the models disclosed herein, for example the graphical machine learning model of FIG. 3.

The structure of the system 100 is one example of a system that may be utilized to train the neural networks described herein. Additional structure for operating and training the machine learning models is shown in FIG. 4, described later.

Regarding manufacturing processes, a final product may go through several work stations before the part is completely finished or manufactured. For example, before a final product is produced, it may first need to be assembled with other sub-components, painted, laser etched, strength tested, or other manufacturing tasks. After each station completes its tasks, measurements may be taken of the part to produce measurement data. This makes sure the part is sufficiently operational, sufficiently connected, sufficiently sized, etc. Measurement data may include which type of station the measurement is taken, which type of part is being measured, and what is the measurement. The measurement can be a binary value, a strength value, a time series value (e.g., a measurement of the response to pressure), floating precision number, number string, integer, Boolean, aggregation of statistics, or the like which represents a physical state or characteristic of the part. This measurement data can be multimodal (e.g., may include multiple types of measurements, such as those listed above as an example). This multimodal measurement data may be input into a neural network described herein. Depending on the measurements taken at the station, the system can determine if the part is sufficient, or instead should be binned or discarded.

This multimodal measurement data inputted in a graph neural network can yield various benefits and can yield a plethora of information that can help manufacturing lead time and logistics. For example, the output of the neural network can yield predictions as to whether the parts will be sufficient for production or assembly into another system, predictions as to whether stations are going to be needed to be offline, predicting yield time, as well as predictions as to where a failure may have occurred along the manufacturing line, why the failure occurred, and the like. In another example, the output of the neural network can yield predicted measurements at any station along the manufacturing line; given this information, one can remove a station (or procedure within that station) devoted to measuring the component being manufactured. This can save time and money in measuring.

Also, predictive measurements of the manufactured part along the manufacturing line can reduce costs associated with scrapping a component. If a measurement of a component can be estimated within the manufacturing line (e.g., at or between every manufacturing station), this can lead to a more precise determination of when a failure or misstep in manufacturing takes place. This can mean scrapping a component earlier in the manufacturing process before it becomes more expensive to do so. Also, depending on when a component is actually measured along the manufacturing process, predicting the measurement of a component before the component is actually measured allows the component to be scrapped earlier in the manufacturing process.

Figure 2:
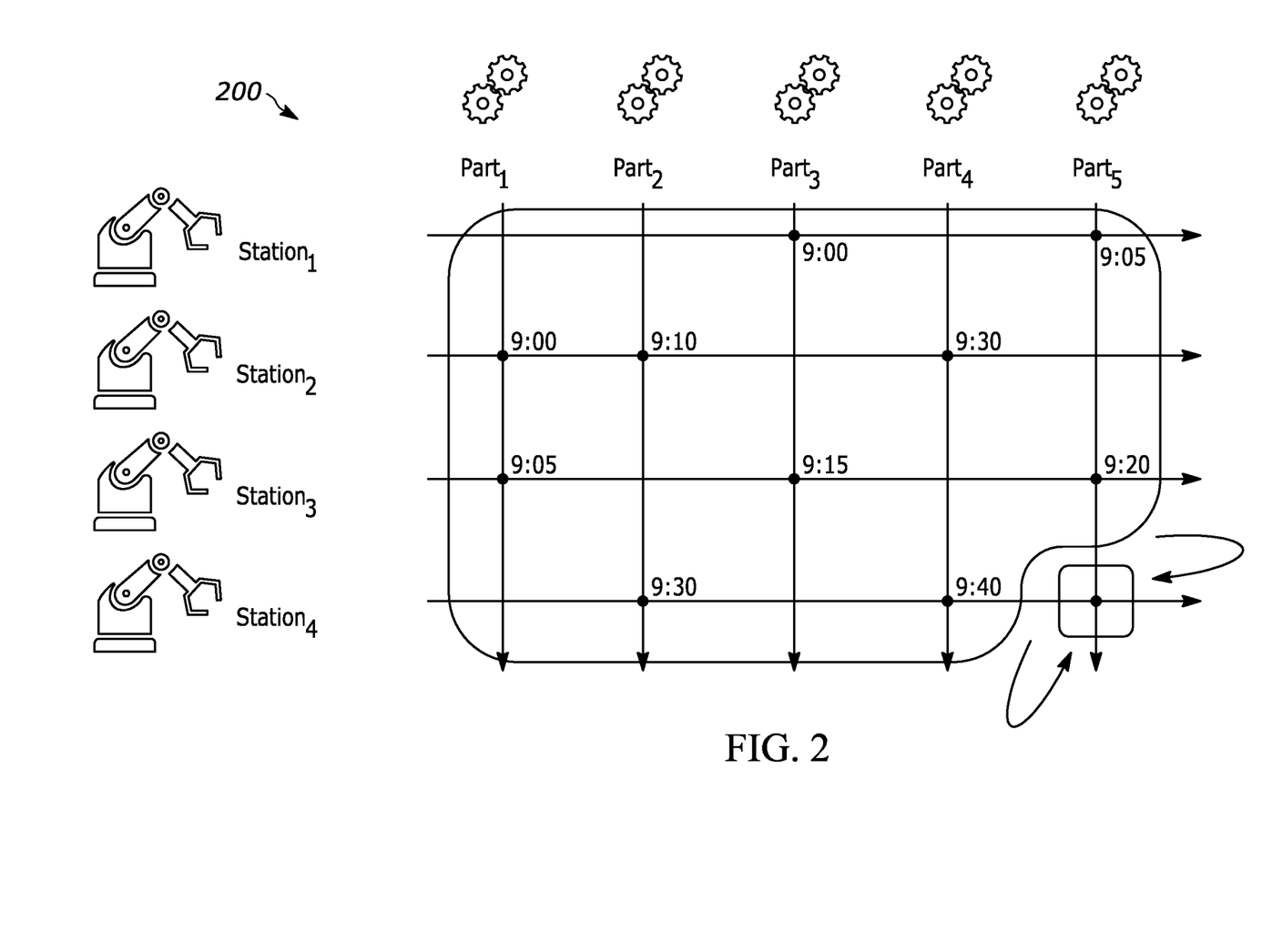
FIG. 2 shows a schematic of a time-ordered, directed graph model, with nodes denoting measurements or records associated with a particular part at a particular station, according to an embodiment.

The machine learning models described herein can therefore be provided with a latent representation of the manufactured parts and the station each part is measured at. FIG. 2 shows a mesh or graphical representation 200 of this data. Each time a particular part gets to a station, the system updates the latent representation. Here, each black circle denotes multimodal measurements or records associated with parts passing through a station. Each black circle is also provided with a time stamp, indicating a time in which each part particular part is measured at that particular station. In the illustrated scenario, the following measurements occur: part1 is measured at station2 at 9:00, and is measured at station3 at 9:05; part2 is measured at station2 at 9:10, and is measured at station4 at 9:30; part3 is measured at station1 at 9:00, and is measured at station3 at 9:15; part4 is measured at station2 at 9:30 and is measured at station4 at 9:40; part5 is measured at station1 at 9:05 and is measured at station3 at 9:20. Before each part is measured, it is in its initialized state, and then works with station2's latent state to produce the multimodal measurements explained above. This illustrated graphical representation of this data may be only a portion of the overall measurements taken; more or less than five parts may be measured, and more or less than four stations may be provided for measurements. The arrows in the graph show the time progression for each part (going top to bottom), and for each station (going left to right). The black circle at the intersection of part5 and station4 may denote the auto regressive problem on which this disclosure is based—being able to predict the measurements or records associated with part 5 passing through station4 given the past representations.

The machine learning systems can take this data—represented in graphical form in FIG. 2—to estimate measurements of any particular part at any particular station. According to embodiments, unsupervised distribution estimation can be performed from a set of examples $(x_1, x_2, \ldots, x_n)$, each composed of variable length sequences of multimodal structural measurements occurring at a corresponding station $((m_1, s_1), \ldots, (m_k, s_k))$, where m is the measurement and s is the station. An example sequence x represents the manufacturing stations a product or part goes through in order of time. From the sequence modeling perspective, the joint probability of measurements at stations can be factorized as follows:

$$P(x) = \coprod_{i=1}^{k} p(x_i | x_{<i}) = \coprod_{i=1}^{k} p((m_k, s_k) | (m_1, s_1), \ldots, (m_{i-1}, s_{i-1})) \quad (1)$$

Learning such probability distribution allows easy queries to or sampling from models with subsequences: $P(x_{>=i} | x_{<i})$.

The models disclosed herein allow the data to be viewed as a sequence from the station view. For example, referring again to FIG. 2, data from station2 can be modeled because data is captured sequentially at 9:00 (from part1), 9:10 (from part2), and 9:30 (from part4). By doing so, one can model the measurements taken from a particular station, and the variable being the particular part passing through the station. This may be important in environment where not every part goes through every station, and not every station measures each part (such as the example illustrated in FIG. 2). Therefore, the probability distribution P(x) modeled is dependent on all parts and corresponding measurements at stations that are included in the set x, prior to the actual occurrence of x. In other words, in order to estimate a measurement at a particular station of a particular part, the model uses as input the past temporal measurements taken of the parts and stations prior to the actual measurement at the particular station of the particular part being performed. Taking FIG. 2 as an example, the probability of part5's sequence depends on the measurements of part3 at station1; part1 and part3 at station3; part2 and part4 at station4; and part1, part2 and part4 at station2. Take part1 at station2 as an example. Part5's sequence is dependent on this node is because part5 at station3 is dependent on station3's latent state at timestamp 9:20, which encodes the subsequence of parts going through station3 before part5 arrives at station3. But part1 at station3 is dependent on part1's latent state at timestamp 9:05, which encodes (and hence depends on) the subsequence of part1 before it reaches station3, meaning part1's latent state at 9:05 is dependent on part1 at station2.

In order to reduce memory and computation consumption at training time, and to shorten inference time, the embodiments disclosed herein can use latent space to encode the subsequence of a part p's sequence $x_{<i}$ into latent state $h^p_i = \text{Encoder}(x_{<i})$. This will further be described below with respect to batch processing. In an embodiment, an auto-regressive encoder is utilized, i.e., $h^p_i = h^p_{i-1} + \text{Encoder}(x_i)$. Similarly, the system can encode the station subsequence up to the $j^{th}$ part into the latent state $h^s_j$. Assuming part p is the $i^{th}$ part that gets measured by station $s_j$, the following equation can apply:

$$P(x) = \coprod_{i=1}^{k} p(x_i | h^p_i, h^{s_s}_{i_p}) \quad (2)$$

Figure 3:
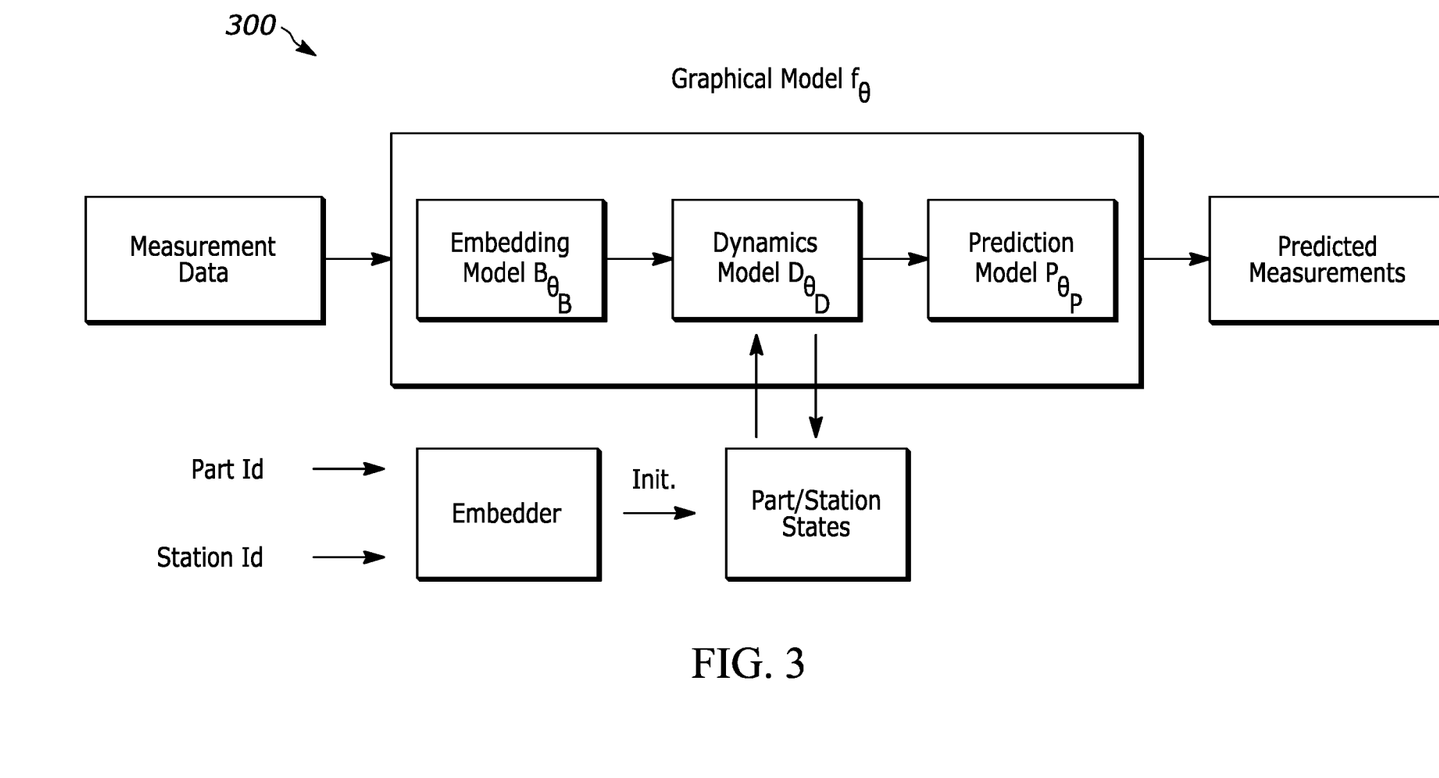
FIG. 3 shows a schematic diagram of a graphical machine learning model for predicting measurements of a particular part at a particular station based on actual part measurement data and latent space representation of a particular part and station, according to an embodiment.

FIG. 3 illustrates a machine learning model 300 being trained according to the descriptions provided herein for optimizing time-based sequential manufacturing data described herein. The machine learning model 300 may be an unsupervised auto-regressive graphical model, according to one embodiment. The machine learning model 300 models multimodal structured data including tabular, time series, and aggregate statistics on a multitype directed graph. Measurements or distribution of the measurements performed on a part at a station (also referred to as measurement data) are used as targets for training the model, and the encoded subsequences (i.e., latent space) of this part and station is used as input. These subsequences or dataset D can be a manufacturing multimodal sequence dataset, without annotations. Each part sequence in D contains the information relating to the type of part, an identifier of the part, the sequence of stations that this part goes through, and the measurements or records at each station. The measurements taken may be a binary value related to size or strength of the part, or a time series value such as a measurement of the part's response to pressure). Other examples of measurements taken include its friction qualities, weight distribution, density, presence of cracks or defects, and other measurements typically included in a manufacturing facility to assure a manufactured part is suitable for further assembly or production.

This measurement data is input into the graphical model $f_\theta$. The model includes three sub-models, or three separate machine learning models, according to an embodiment: an embedding model, a dynamics model, and a prediction model. Each of these machine learning models may neural networks or sub-networks in the form of a GNN, CNN, or the like.

Because embodiments of this system uses an auto-regressive encoder for part and station state information, an initialization is derived for both states when no measurements were observed. This receives attributers of the part, or attributes of the manufacturing station to generate an initial state of the part or station. An example would be a certain size dimension of a particular part before being subjected to action at a particular station.

The embedding model can be referred to as an embedding network or $B_{\theta_B}$, where B is the batch size (the batching process is described further below). This model is configured to embed a set of measurement data (e.g., of varying type described above, such as floating precision number, string, integer, Boolean, time series measurements, aggregation of statistics, etc.) into a float array or vector that the dynamics model can consume. Depending on the type of measurement data, the embedding model can have different architectures. For example, if the measurement data are all floating numbers or integers, B can simply be a multi-layer perceptron. In another example, if the measurement data includes time series data, a 1-dimensional convolutional network can be applied to extract the features.

The dynamics model can be referred to as a dynamics network or $D_{\theta_D}$, where again D can be a part/station subsequence dataset encoded into the latent space. Any time-series model with latent state can be used for this model, such as a recurrent neural network. Each part sequence in the dynamics model contains the information relating to the type of part, an identifier of the part, the sequence of stations that this part goes through. The input to the dynamics model can be the current embedded measurements $(x_i)$ of equation (2) above, and current state of the part and station, i.e., $h^p_i, h^{s_i}_{i_p}$ of equation (2) above. The dynamics model includes the updated part and station state, i.e., $h^p_{i+1}, h^{s_i}_{i_p+1}$.

The prediction model can be referred to as a predicted network or $P_{\theta_P}$. The prediction model takes as input the part and station's latent state $h_i^P$, $h_{i_p}^{s_i}$ and predicts (1) measurements of part p at station $s_i$ ($x_i$), or (2) quantiled measurement if the measurement is float-valued. Predicting quantiled measurements allows the learned model to predict likelihoods of each quantile of the measurement distribution, and allows sampling from the model.

The output of the overall model $f_\theta$ is a predicted measurement, such as a prediction of one of the nodes in FIG. 2. The model $f_\theta$ can continue to operate until convergence, producing a trained machine learning model that can predict a measurement of a part based on the previous temporal measurements and the latent space representation of the manufactured part and station.

In the dynamics model, the manufactured part state and the station state of one node go into the dynamics model to produce a measurement, as well as update the states themselves. The dynamics model is configured to model the graph shown in FIG. 2, for example, from part1 to part5, and from station1 to station4. This is done with subsequence modeling, including modeling by taking latent space of the manufactured part and the station. So, referring to FIG. 2 as an example, the measurement data captured at 9:00 for part1, station2 is used to determine a predicted measurement of the node shown at part1, station 3 at 9:05. In particular, the latent state (either in its initialized state if not used before, or in its updated state after a previous measurement) of station3 is used to predict the measurement of part1 that would happen at 9:05. This produces a predicted measurement for part1 at station3. And, after producing each predicted measurement, the model can be updated and trained. Since the measurement data includes the real measurements, and the model produces a predicted measurement, the graphical model can derive a difference between the real measurement data and the predicted measurement. This difference between the actual measurement data and the predicted measurement can be used to update parameters of the graphical model to minimize the difference according to training methods described above. The process can then repeat, with continued steps to derive predicted measurements, compare the predicted measurements to the actual measurement data taken from a sensor, and use the difference between the actual and estimated measurements to update the model's parameters. This process can repeat until the model achieves a predetermined performance level (e.g., ~100% agreement between the predicted measurements and the actual measurement data), or convergence (e.g., a set number of iterations occurring, or that the difference is sufficiently small (e.g., the change in the approximate probability over iterations is changing by less than a threshold), or other convergence conditions).

Some manufacturing facilities may have a large number of stations, or many different types of parts being measured. This could lead to an exuberant amount of data. In order to train the neural networks described herein with such a large amount of data, the neural networks can be trained with samples of data. Processing all nodes temporally can be an enormous undertaking—e.g., obtaining measurement data at 9:00, then train the model, then predicting a measurement at 9:05, then comparing it to the actual measurement data at 9:05, then comparing the difference, then updating the model, and repeating this process for all nodes. It may be preferable to execute the machine learning model with at least some of the data (nodes) at the same time.

But training of the system requires an estimated measurement to be made independent of the actual measurement data, and the estimated measurement is affected by the previous measurements and estimations which update the model. So, referring to FIG. 2 as an example, the system may not be configured to be trained by predicting measurements for the node at part 1, station2 and part2, station2 at the same time—the predicted measurement at part2, station2 depends on the earlier model execution and actual data measurement of the node at part1, station2. In other words, the 9:00 node at part1, station2 is a parent to the 9:10 node at part2, station2. The model therefore processes the measurements of part1, station2, then updates the latent state of station2, and only then can process part2 at station2. It can therefore be said that since the machine learning model updates data at each node as it is executed, nodes that are located earlier in time being updated as the machine learning model is processing effect the later nodes being estimated, so all data points in the graph cannot be executed at the same time.

Therefore, the system can grab some nodes that are not dependent on one another in order to perform batch processing. For example, the node at part1, station2 and the node at part3, station1 are not dependent on each other; the measurements at each node will not affect the execution of the model at the other node. (In fact, these two nodes are timestamped identically at 9:00, although that is not a requirement for batch processing, but further illustrates that the two nodes are not dependent on each other.) The same can be said for the nodes at part1, station3 and at part2, station2. The use of batch processing can help reduce processor power output, memory limitations, and cost.

In a process referred to as standard batching, a dependency graph can be built, with each measurement connected to a previous measurement. The graph can be built based on parents and dependencies of nodes. For example, if a chosen node at part2, station2, the graph can be built looking backward in time from that station and part to see what parent nodes there are (e.g., what nodes would, if executed by the model for updating and training, affect the execution of the model at the chosen node). The immediate parents to the chosen node can be determined by traveling linearly upward (backward in time) along the vertical edge from the chosen node until another node is reached, and by traveling linearly to the left (backward in time) along the horizontal edge from the chosen node until another node is reached. Then the process can repeat, finding the immediate parents of those nodes, and so on, to build the graph. While traversing, the batching model can assign a chunk number $c_v$ to each node or vertex v, where v=max(chunk number of all v's parents)+1 if number of vertices in $c_v$ is less than batch size B; otherwise assign chunk number $c_v$+1 to v. Then, a batch will be a set of consecutive chunks. This ensures that all measurements or records are only processed after all the direct dependencies are met (e.g. both sequence of measurements associated with components visiting a station and sequence of measurements associated stations visited by a part are respected).

In another embodiment of batching, full part sequence batching can be utilized. While standard batching ensures all dependencies of a set of measurements are encoded beforehand, some part sequences are not loaded fully in a batch because of memory constraints and range of data collection (e.g., too many parts being produced in a short time frame). When a part sequence is not loaded fully in a batch, the dynamic model $D_{\theta_D}$ may only be optimize to the subsequences that are loaded. On the other hand, the station latent state may change with a slower dynamic than the part latent state, i.e., small changes to station state during the whole production time span of a part. Therefore, for each part in a standard batch that is included in the batch (but not its full part sequence), the system can add another batch in which full part sequences of such parts included. Referring to FIG. 4 for example, the batch may be constructed such that it includes all nodes or vertexes going upward until the first time that particular part is measured, such that the entire sequence of nodes for a particular part are included in the batching process.

Therefore, the training of the machine learning model shown in FIG. 3 can be performed with batching as follows. For all data samples in D, the system can assign a batch number or chunk number to each measurement set (e.g., a particular part at a particular station). For the $k^{th}$ batch, the system can load all measurement set with chunk numbers in the range of (k−1)*B to k*B into memory. If the system is using full sequence batching, the system can append a batch with full sequences after the B chunks. The system can use either the measurements (measurement data) or quantiled measurements as a target, and run each chunk in parallel through the graphical machine learning model $f_\theta$. Then, after all B chunks have done a forward pass through $f_\theta$, the system can update θ with the gradient of $f_\theta$ and update the part and station latent states, if the parts have not reached the end of their sequences. This is repeated through the whole dataset until convergence, or a predetermined number of epochs.

The neural network algorithms and/or methodologies of one or more embodiments described herein are implemented using a computing platform, such as the computing platform 400 illustrated in FIG. 4. The computing platform 400 may include memory 402, processor 404, and non-volatile storage 406. The processor 404 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 402. The memory 402 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. The non-volatile storage 406 may include one or more persistent data storage devices such as a hard drive, optical drive, tape drive, non-volatile solid state device, cloud storage or any other device capable of persistently storing information.

The processor 404 may be configured to read into memory 402 and execute computer-executable instructions residing in embedding model 408 of the non-volatile storage 406 and embodying embedding algorithms and/or methodologies of one or more embodiments disclosed herein. The processor 404 may be further configured to read into memory 402 and execute computer-executable instructions residing in dynamics model 410 of the non-volatile storage 406 and embodying dynamics algorithms and/or methodologies described herein. The processor 404 may be further configured to read into memory 402 and execute computer-executable instructions residing in prediction model 412 of the non-volatile storage 406 and embodying prediction algorithms and/or methodologies described herein. The models 408-412 may include operating systems and applications. The models 408-412 may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

Upon execution by the processor 404, the computer-executable instructions of the models 408-412 may cause the computing platform 400 to implement one or more of the neural network algorithms and/or methodologies disclosed herein. The non-volatile storage 406 may also include measurement data 414 and data 416 representing an identification of the part and station at each node, as described herein. The measurement data 414 can include data captured or taken from a sensor located at a particular station in the manufacturing process. The sensor may be an image sensor, laser displacement/measurement sensor, contact sensor, or any other type of sensor configured to yield data representing a physical quality, state, or characteristic of the part being measured.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

As explained above, according to various embodiments disclosed herein, methods and systems for performing root cause analysis with a trained machine learning model are provided. In particular, the trained machine learning model described above with reference to FIGS. 1-4 is configured to determine a predicted measurement data, such as a predicted measurement of a part at a work station. Since the trained model can predict a measurement, the system described herein can compare actual measurements to the predicted measurements in determining the root cause. The model has already learned the representation of normal data, and so comparing this to actual data—and evaluating the difference—can lead to an identification of the root cause of a problem according to the teachings herein.

This disclosure proposes utilizing the pre-trained models described herein for root cause analysis. Such models $f_\theta$: $R^{[d_1, d_2, \ldots, d_{k-1}] \times S \times T} \to R^d$ take a subsequence of part measurements $[x_1, x_2, \ldots, x_{k-1}]$ with the station state $[S_1, S_2, \ldots, S_{k-1}]$ and the type $T_x$ of this part to predict measurements or the likelihood of measurements of the part at the station $S_k$. Here $x_i = \{x_i^1, x_i^2, \ldots, x_i^{j-i}\}$ is a multi-modality measurement at station $S_i$. It can be assumed that the model is sufficiently trained (e.g., close to a local minimum of loss) over a training set that contains mostly non-faulty parts and stations, therefore, the model learns to predict measurements of normal (non-faulty) parts. It can also be assumed that the loss function L for training f is given.

Several methods of identifying a root cause within a manufacturing process are provided. Given a faulty part P (or population of parts) that is identified at its $k^{th}$ station $S_k$ as faulty, this disclosure proposes to utilize gradients and losses of the pre-trained model $f_\theta$ to identify root causes. In a first embodiment, back propagation is used based to determine a gradient. A sequence of new, real measurement data for every station up to the $k^{th}$ station (i.e., the station where the fault is determined or estimated to be occurring) is back propagated through the trained model, such as the models described above. For example, the magnitudes of absolute gradient values of the model $f_\theta$ over a set of variables represent how sensitive the function is against the set of variables. Hence, changes in variables with larger absolute gradient values are more likely to cause changes in the predicted (normal) measurements to change. The root cause $R_{xk}$ is then identified as:

$$R_{xk} = \arg\max(|\partial f_\theta([x_1, \ldots x_{k-1}, S_1, \ldots, S_{k-1}], T_x)/\partial x_1, x_2, \ldots, x_{k-1}, S_1, \ldots, S_{k-1}|) \quad (3)$$

The gradient can indicate which one of the data points (either x and/or s) is the highest influencer on the model. It should be noted that the root causes identified by equation (1) above are either measurements or station identifications since the variable set that it takes gradients over are the measurements $(x_1, x_2, \ldots, x_{k-1})$ and stations $(S_1, \ldots S_{k-1})$.

In another embodiment, a gradient is not taken via back propagation of the trained model, as above. Instead, a comparison is made between the predicted measurements and the actual measurements for each station, and a loss function is utilized. In this embodiment, predicted measurements at each step of the manufacturing facility can be compared to an actual measurement at that step. A loss function comparison L can identify at what point do the predicted measurements and actual measurements deviate the most. This can help identify the root cause as either the measurement or the station where parts are being measured. Since the model $f_\theta$ is trained to predict the measurements of non-faulty parts, the measurement or measurements at stations before (upstream) the $k^{th}$ station where the part is identified as faulty $([x_1, x_2, \ldots, x_{k-1}], (S_1, \ldots S_{k-1}))$ can be identified as those measurements that deviate the most from non-faulty parts by computing losses between the predicted measurements and the real measurements. In other words, a root cause $R_{xk} = x_{i^*}^{i^*_j}$ for part measurement data is determined, where $$i^*, i_j^* = \arg\max_{0 \le i < k, j_i} (L(f_\theta([\{x_1^1, x_1^2, \ldots, x_1^{j_1}\}, \ldots, \{x_i^1, \ldots, x_i^{j_i}\}], (s_1, \ldots, s_i), T_x), x_{i+1})) \quad (4)$$

Formula (4) is an example of a method of identifying the root cause based on measurement data by comparing actual measurements of the measurement data to predicted measurement data.

And, a root cause $R_{xk} = S_{i^*}$ regarding station identification is determined, where $$i^* = \arg\max_{0 \le i < k,} (L(f_\theta([x_1, \ldots, x_i], (s_1, \ldots, s_i), T_x), x_{i+1})) \quad (5)$$

Formula (5) is an example of a method of identifying the root cause based on station identification (e.g., which station is the root cause of the faulty part) by comparing actual measurement data to predicted measurement data on a per-station basis.

In some embodiments, the manufacturing facility may process multiple different types of parts. For example, a manufactured spark plug may include a gasket, a metal body, a wire, an insulator, and an electrode, all of which are assembled together to create a fully assembled spark plug. The teachings herein can be applied to such a manufacturing process to identify the part type that is the root cause of any fault or issue. According to an embodiment, a gradient of a sequences of measurement data is determined, on multiple part types. Then, the part type with the highest gradient can indicate the part type that is the root cause.

For example, given a set of faulty parts $\mathcal{P}_{faulty}$ and corresponding measurement subsequences, $\mathcal{P}_{faulty} = \{P^{(i)}, [x_1^{(i)}, \ldots, x_{k_i}^{(i)}], T_{p^{(i)}}\}_{i=1}^n$, a classification model (e.g., binary classification head) c, parameterized by parameter set $\phi$, $c_\phi: \mathbb{R}^d \to \{0, 1\}$ can be trained with using outputs of the pretrained model $f_\theta$ to predict if a part will be faulty or not. Here the output set $\{0, 1\}$ refers to the part is predicted to be faulty (1) or not (0), and the input dimension d is the output dimension of $f_\theta$. The binary classification head can be trained using either at least some of the training set of $f_\theta$, which consists mostly non-faulty parts, combined with the faulty part set $\mathcal{P}_{faulty}$. Assuming $g_{\phi \cup \theta} = c_\phi(f_\theta([x_1, \ldots, x_k], (s_1, \ldots, s_k), T_x))$, being the end-to-end classifier which receives part sequence $\{[x_1, \ldots, x_k], (s_1, \ldots, s_k), T_x\}$ and first extract features with $f_\theta$ then use such feature to predict if the part is faulty with $c_\phi$. The part type that is the root cause can be identified as the part type with the highest sum of gradient over all parts in $\mathcal{P}_{faulty}$, as shown in formula (6) below:

$$R_P = T_{P^*}, \quad (4)$$

where $$P^* = \underset{T \in T_p(i), 1 \le i \le n}{\arg\max} \sum_{i=1}^n \frac{\partial g_{\phi \cup \theta}([x_1^{(i)}, \ldots, x_k^{(i)}], (s_1^{(i)}, \ldots s_k^{(i)}), T_x)}{\partial T}$$

Given the gradient of $g_{\phi \cup \theta}$, the part type that has the highest sum of gradients is the identified root cause. It should be noted here that unlike embodiments above, neither the gradient of $f_\theta$ nor the gradient of the station s is necessary in this determination. Moreover, this method of determining root cause based on part type can be applied to various settings and models, and need not rely on the model $f_\theta$ described above.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method of utilizing a pre-trained machine learning model to perform root cause analysis on a manufacturing process, the method comprising:
   providing a pre-trained machine learning model that is trained to predict measurements of non-faulty parts, wherein the pre-trained machine learning model is trained based on a first set of measurement data regarding physical characteristics of a first plurality of manufactured parts as measured by a plurality of sensors at a plurality of manufacturing stations;
   receiving, from the plurality of sensors at the plurality of manufacturing stations, a second set of measurement data regarding physical characteristics of a second plurality of manufactured parts and an identification of the plurality of manufacturing stations;
   back propagating the second set of measurement data through the pre-trained machine learning model to determine a magnitude of absolute gradients of the second set of measurement data; and
   identifying a root cause within the manufacturing process based on the magnitude of absolute gradients.

2. The method of claim 1, further comprising:
   training a binary classification model using outputs of the pre-trained machine learning model to output predictions of whether at least one part type of a plurality of part type will be faulty;
   determining a magnitude of absolute gradients of the binary classification model; and
   identifying at least one of the plurality of part types as a root cause within the manufacturing setting based on the magnitude of absolute gradients.

3. The method of claim 1, wherein the root cause is identified as $$R_{xk}=\arg\max(|\partial f_\theta([x_1, \ldots, x_{k-1}, S_1, \ldots, S_{k-1}], T_x)/\partial x_1, x_2, \ldots, x_{k-1}, S_1, \ldots, S_{k-1}|)$$

wherein $f_\theta$ is the pre-trained machine learning model, x is a portion of the second set of measurement data regarding physical characteristics of the second plurality of manufactured parts, S is the identification of the plurality of manufactured stations, and k is one of the plurality of manufacturing stations in which a fault is identified.

4. The method of claim 3, wherein the pre-trained model is trained by:
   via a time-series dynamics machine learning model, encoding the first set of measurement data into a latent space having a plurality of nodes, each node associated with the first set of measurement data of one of the non-faulty parts as measured at one of the manufacturing stations.

5. The method of claim 4, wherein the pre-trained model is further trained by:
   via a prediction machine learning model, determining a predicted measurement of a first of the non-faulty parts at a first of the plurality of manufacturing stations based on the latent space of at least some of the first set of measurement data not including the measurement data corresponding to the first manufactured part at the first manufacturing station.

6. The method of claim 5, wherein the pre-trained model is further trained by:
   via the prediction machine learning model, comparing the predicted measurement of the first manufactured part to the measurement data of the first manufactured part at the first manufacturing station; and
   based on a difference between the predicted measurements and the actual measurement data, updating parameters of the machine learning model until convergence.

7. The method of claim 1, wherein the plurality of sensors includes image sensors or laser measurement sensors.

8. A computer-implemented method of utilizing a pre-trained machine learning model to perform root cause analysis on a manufacturing process, the method comprising:
   providing a pre-trained machine learning model that is trained to predict measurements of non-faulty parts, wherein the pre-trained machine learning model is trained based on a first set of measurement data regarding physical characteristics of a first plurality of manufactured parts as measured by a plurality of sensors at a plurality of manufacturing stations;
   utilizing the pre-trained machine learning model to produce a set of predicted measurement data for each manufacturing station;
   receiving, from the plurality of sensors at the plurality of manufacturing stations, a second set of measurement data regarding physical characteristics of a second plurality of manufactured parts and an identification of the plurality of manufacturing stations;
   determining losses between the set of predicted measurement data and the second set of measurement data for each of the plurality of manufacturing stations; and
   identifying a root cause within the manufacturing process based on the losses.

9. The method of claim 8, wherein the root cause includes a portion of the second measurement data regarding physical characteristics of the second plurality of manufactured parts, and wherein the root cause is represented by $R_{xk}=x_{i*}^{i*j}$;
   wherein $$i^*, i_j^* = \arg\max_{0\leq i<k,\, j_i} (L(f_\theta([\{x_1^1, x_1^2, \ldots, x_1^{j1}\}, \ldots, \{x_i^1, \ldots, x_i^{ji}\}], (s_1, \ldots, s_i), T_x), x_{i+1}));$$

wherein $f_\theta$ is the pre-trained machine learning model, x is a portion of the second set of measurement data regarding physical characteristics of the second plurality of manufactured parts, S is the identification of the plurality of manufacturing stations, T is a type of the second plurality of manufactured parts, and k is one of the plurality of manufacturing stations in which a fault is identified.

10. The method of claim 8, further comprising:
    wherein the pre-trained model is trained by:
    via a time-series dynamics machine learning model, encoding the first set of measurement data into a latent space having a plurality of nodes, each node associated with the first set of measurement data of one of the non-faulty parts as measured at one of the manufacturing stations.

11. The method of claim 10, wherein the pre-trained model is further trained by:
    via a prediction machine learning model, determining a predicted measurement of a first of the non-faulty parts at a first of the plurality of manufacturing stations based on the latent space of at least some of the first set of measurement data not including the measurement data corresponding to the first manufactured part at the first manufacturing station.

12. The method of claim 11, wherein the wherein the pre-trained model is further trained by:
  via the prediction machine learning model, comparing the predicted measurement of the first manufactured part to the measurement data of the first manufactured part at the first manufacturing station; and
  based on a difference between the predicted measurements and the actual measurement data, updating parameters of the machine learning model until convergence.

13. The method of claim 8, wherein the plurality of sensors includes image sensors or laser measurement sensors.

14. A computer-implemented method of utilizing a pre-trained machine learning model to perform root cause analysis to determine a part type causing a fault within a manufacturing setting, the method comprising:
  providing a pre-trained machine learning model that is trained to predict measurements of non-faulty parts, wherein the pre-trained machine learning model is trained based on a first set of measurement data regarding physical characteristics of a first plurality of manufactured parts as measured by a plurality of sensors at a plurality of manufacturing stations;
  training a binary classification model using outputs of the pre-trained machine learning model to output predictions of whether at least one part type of a plurality of part type will be faulty;
  determining a magnitude of absolute gradients of the binary classification model; and
  identifying at least one of the plurality of part types as a root cause within the manufacturing setting based on the magnitude of absolute gradients.

15. The method of claim 14, further comprising:
  receiving, from the plurality of sensors at the plurality of manufacturing stations, a second set of measurement data regarding physical characteristics of a second plurality of manufactured parts and an identification of the plurality of manufacturing stations;
  back propagating the second set of measurement data through the pre-trained machine learning model to determine a magnitude of absolute gradients of the second set of measurement data; and
  identifying a root cause within the manufacturing process based on the magnitude of absolute gradients.

16. The method of claim 14, wherein the root cause is represented by $R_P = T_{P*}$, wherein T is a type of part P, and where $$P^* = \operatorname*{argmax}_{T \in T_p(i),\, 1 \leq i \leq n} \sum_{i=1}^{n} \frac{\partial g_{\varphi \cup \theta}\left([x_1^{(i)}, \ldots, x_k^{(i)}], (s_1^{(i)}, \ldots s_k^{(i)}), T_x\right)}{\partial T}$$

wherein x is a portion of the measurement data regarding physical characteristics of the plurality of manufactured parts, S is the identification of the plurality of manufactured stations, and k is one of the plurality of manufacturing stations in which a fault is identified.

17. The method of claim 14, wherein the pre-trained model is trained by:
  via a time-series dynamics machine learning model, encoding the first set of measurement data into a latent space having a plurality of nodes, each node associated with the first set of measurement data of one of the non-faulty parts as measured at one of the manufacturing stations.

18. The method of claim 17, wherein the pre-trained model is further trained by:
  via a prediction machine learning model, determining a predicted measurement of a first of the non-faulty parts at a first of the plurality of manufacturing stations based on the latent space of at least some of the first set of measurement data not including the measurement data corresponding to the first manufactured part at the first manufacturing station.

19. The method of claim 18, wherein the wherein the pre-trained model is further trained by:
  via the prediction machine learning model, comparing the predicted measurement of the first manufactured part to the measurement data of the first manufactured part at the first manufacturing station; and
  based on a difference between the predicted measurements and the actual measurement data, updating parameters of the machine learning model until convergence.

20. The method of claim 14, wherein the plurality of sensors includes image sensors or laser measurement sensors.

* * * * *